Dec. 19, 1933.     H. W. ASHMUSEN     1,940,522
COOLING SYSTEM AND CYLINDER HEAD CONSTRUCTION
Filed Oct. 12, 1931     2 Sheets-Sheet 1

Inventor
H. W. Ashmusen, Deceased
By C. M. Ashmusen, Executrix.
By Lacey & Lacey, Attorneys Dec. 19, 1933.  H. W. ASHMUSEN  1,940,522
COOLING SYSTEM AND CYLINDER HEAD CONSTRUCTION
Filed Oct. 12, 1931  2 Sheets-Sheet 2
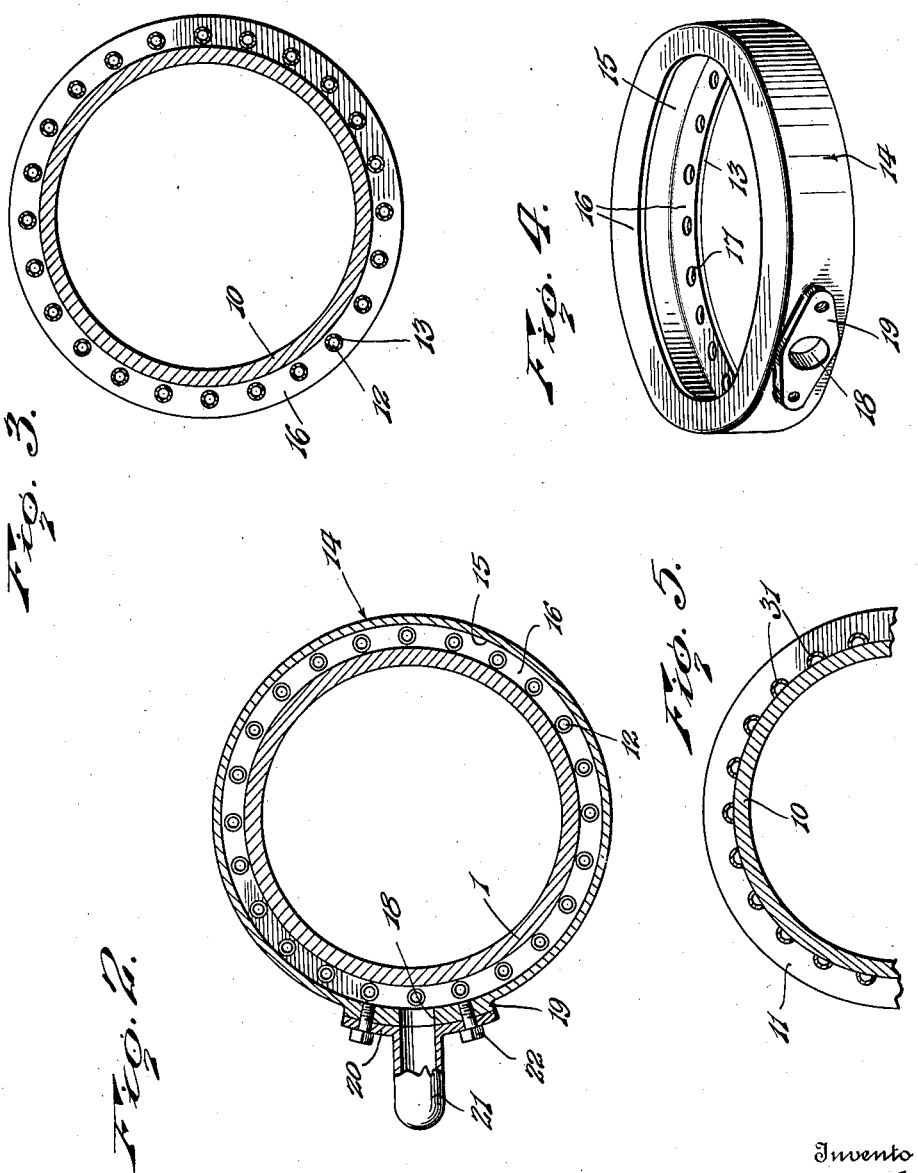

Patented Dec. 19, 1933

1,940,522

UNITED STATES PATENT OFFICE 1,940,522

COOLING SYSTEM AND CYLINDER HEAD CONSTRUCTION

Henry W. Ashmusen, deceased, late of Omaha, Nebr., by Clara M. Ashmusen, executrix, Omaha, Nebr.

Application October 12, 1931. Serial No. 568,421

3 Claims. (Cl. 123—171)

This invention relates to cooling systems and has for an object to provide means for air cooling the cylinder and the valves of an internal combustion motor or other machine.

A further object is to provide a system of tubes which extend along the cylinder and through which air is drawn by suction of the carbureter so that the cylinder is simultaneously cooled and the warm air utilized for rendering the fuel more highly volatile.

A still further object is to provide a cooling system which may be readily applied to old motors or to motors during manufacture without extensive alteration.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Fig. 2 is a cross sectional view on the line 2—2 of Fig. 1,

Fig. 3 is a cross sectional view taken on the line 3—3 of Fig. 1,

Fig. 4 is a detail perspective view of the manifold,

Fig. 5 is a view similar to Fig. 3 but showing tubes or flutes of half round cross section.

Figure 1:
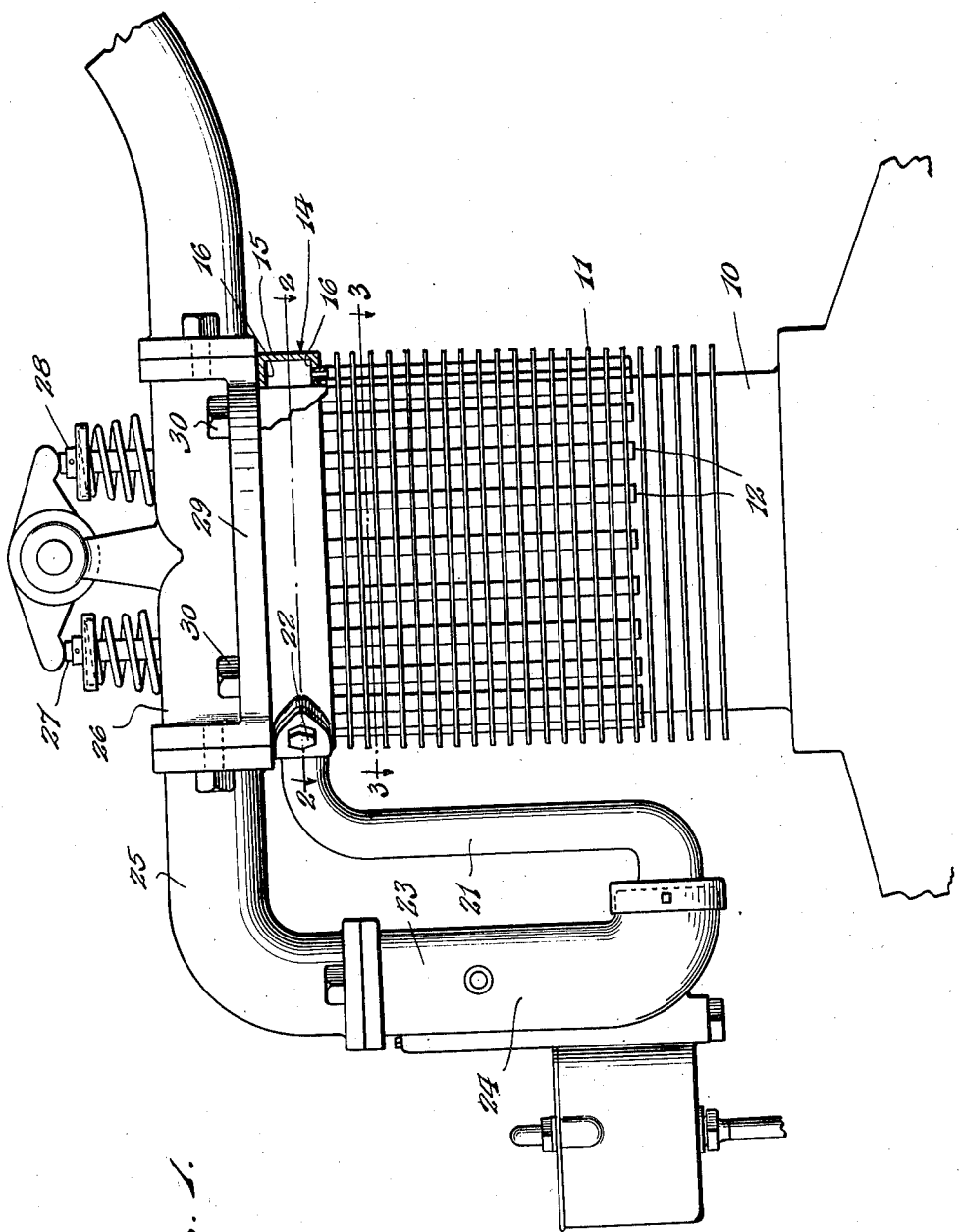
Fig. 1 is a side elevation of the invention in applied position.

Referring now to the drawings in which like characters of reference designate similar parts in the various views, 10 designates the cylinder of an internal combustion engine, the same being provided with integral annular heat radiating fins or flanges 11. The cylinder may be provided with a fixed or removable head.

In carrying out the invention, I preferably provide a plurality of flutes or tubes 12 and arrange the tubes in an annular series around the cylinder, parallel with each other. Preferably, the tubes are passed through openings 13 formed in the flanges 11, and are open at both ends. In further carrying out the invention, I provide an annular manifold 14 comprising, as best shown in Fig. 4, a circular wall 15 and a pair of annular flanges 16 extending radially from the wall. The inner diameters of the flanges 16 are sufficient to permit of the manifold being slipped onto the cylinder or forced thereupon with a driving fit or otherwise assembled with the cylinder.

One of the flanges 16 is provided with a plurality of openings 17 in which the outer ends of the tubes 12 are threaded or forced thereinto with a driving fit or otherwise secured to mount the tubes as a unitary assembly with the manifold. Preferably the tubes may be screwed into the manifold and the assembly then slipped onto the cylinder with the tubes registering with the openings 13 so that quick assembly and mounting of the device is promoted.

The manifold 14 is provided in the circular wall 15 thereof with an outlet opening 18, as best shown in Figs. 2 and 4, a boss 19 being formed around the opening on the cylinder wall to form a seat for the flange end 20 of an outlet pipe 21. Stud bolts 22, or other connectors, are passed through the flange 20 of the pipe and into the boss to mount the pipe in place.

The pipe 21 is connected in any preferred manner to the air intake 23 of a carbureter 24 of any well known type. A pipe 25 connects the outlet of the carbureter with the valve chamber in the cylinder head 26.

The cylinder head may be of any preferred type equipped to mount inlet and outlet valves 27 and 28 and preferably the head is provided with a flange 29 which is bolted, as shown at 30, to the cylinder and also forms a stop against which the adjacent flange 16 of the air manifold 14 bears, as best shown in Fig. 1.

Insomuch as the invention is directed particularly to the cooling system, a detail description of the cylinder head valves, timing mechanisms, and so forth, is deemed unnecessary as these parts may be of the usual internal combustion engine construction.

In operation, the suction of the carbureter draws air through the tubes 12 longitudinally of the cylinder into and through the manifold 14 and from thence into the mixing chamber of the carbureter through the pipe 21. During the passage of the air in the path indicated, the cylinder will be cooled since, as is best shown in Fig. 2, the tubes are disposed substantially in contact with the cylinder. Also the valves will be cooled since the manifold 14 is disposed contiguous to the head of the motor. It will be evident that the air will take up the heat during its travel through the tubes and manifold so that heated air is delivered to the carbureter to provide a more highly volatile mixture than is the case where cool air is supplied to the carbureter.

It will be pointed out that the cooling device above described may be built into new motors during the course of manufacture without alteration to the engine design and also may be equally well applied to air cooled motors having cooling fins or flanges by simply drilling the necessary holes in the flanges to receive the tubes.

It will further be pointed out that while tubes of circular cross section are illustrated, it is not intended to limit the construction to tubes of circular cross section, as the tubes, or flutes, may be, for instance, half round, as shown at 31, Fig. 5, or of any other cross section desired. Also, the number and arrangement of tubes, as illustrated, is merely by way of example, it being understood that the number of tubes may be increased or diminished to suit specific requirements and further that the tubes may be arranged to contact with the cylinder or may be spaced slightly therefrom without departing from the spirit of the invention.

What is claimed is:

1. In a cooling device for motor cylinders and valves, the combination with a cylinder having a valved head and integral heat radiating fins, of an annular series of substantially parallel air intake tubes extending longitudinally of the cylinder through the fins, an annular manifold surrounding the cylinder adjacent said head and communicating with the tubes, and a carbureter air intake pipe connected with the manifold.

2. The combination with an engine cylinder having a removable head provided with a securing flange, of integral heat radiating fins on the cylinder, an annular air manifold surrounding the cylinder contiguous to said flange of the cylinder head, a plurality of tubes extending longitudinally of the cylinder through said fins and connected to said manifold, and a carbureter air intake pipe connected to said manifold.

3. In combination, an internal combustion engine cylinder provided with heat radiating fins, a head for the cylinder having a securing flange bolted to the end of the cylinder, valves carried by said head, an air manifold surrounding the cylinder contiguous to said flange and said valves, a plurality of tubes carried by the manifold and extending along the cylinder through orifices provided therefor in said fins, a carbureter, a pipe connecting the air intake of the carbureter with said manifold, and a pipe connecting the outlet of the carbureter with said cylinder head.

CLARA M. ASHMUSEN. [L.S.]
*Executrix of last will and testament of H. W. Ashmusen, deceased.*